United States Patent
Knecht et al.

[11] Patent Number: 5,920,669
[45] Date of Patent: Jul. 6, 1999

[54] RECEPTACLE HAVING A ROTATABLE COUPLING NUT FOR ENGAGING A FIBER OPTIC CONNECTOR ASSEMBLY

[75] Inventors: Dennis M. Knecht; Thomas Theuerkorn; James P. Luther, all of Hickory, N.C.

[73] Assignee: Siecor Corporation, Hickory, N.C.

[21] Appl. No.: 08/870,667

[22] Filed: Jun. 6, 1997

[51] Int. Cl.[6] ................................. G02B 6/36
[52] U.S. Cl. .................. 385/76; 385/59; 385/60; 385/78; 385/84; 385/138
[58] Field of Search ................ 385/137, 76, 59, 385/60, 66, 67, 68, 71, 72, 84, 139, 138, 78

[56] References Cited

U.S. PATENT DOCUMENTS

| | | | |
|---|---|---|---|
| 4,114,979 | 9/1978 | Heldt | 350/96.21 |
| 4,353,620 | 10/1982 | Schultz | 350/96.21 |
| 5,000,536 | 3/1991 | Anderson et al. | 350/96.2 |
| 5,050,956 | 9/1991 | Carpenter et al. | 385/140 |
| 5,091,990 | 2/1992 | Leung et al. | 385/81 |
| 5,210,810 | 5/1993 | Darden et al. | 385/78 |

*Primary Examiner*—Hung N. Ngo

[57] ABSTRACT

The receptacle includes a rotatable coupling nut for engaging an externally threaded fiber optic connector assembly or plug which is mounted upon the end portion of a fiber optic cable. As such, the cross-sectional dimensions of the fiber optic connector assembly can be significantly decreased, thereby permitting the fiber optic cable to be pulled through much smaller ducts or passageways. The receptacle also includes a receptacle body adapted to be mounted in a fixed position, such as to a sidewall of an enclosure. The coupling nut cooperably engages the receptacle body such that the coupling nut is free to rotate relative to the receptacle body even though the longitudinal movement of the coupling nut relative to the receptacle body is limited. In this regard, the coupling nut extends through an aperture defined by the receptacle body such that a flange extending radially outward from the rear end of the coupling nut engages the receptacle body to thereby limit longitudinal movement of the coupling nut in a forward direction. The receptacle can also include an inner sleeve extending at least partially through the longitudinally extending bore of the coupling nut. The inner sleeve can include a flanged rear portion connected to the receptacle body rearward of the rear end of the coupling nut to thereby limit longitudinal movement of the coupling nut in a rearward direction.

23 Claims, 5 Drawing Sheets

RECEPTACLE HAVING A ROTATABLE COUPLING NUT FOR ENGAGING A FIBER OPTIC CONNECTOR ASSEMBLY

FIELD OF THE INVENTION

The present invention relates generally to receptacles for receiving corresponding fiber optic connector assemblies and, more particularly, to receptacles having rotatable coupling nuts for engaging corresponding fiber optic connector assemblies.

BACKGROUND OF THE INVENTION

Optical fibers are used in an increasing number and variety of applications, such as a wide variety of telecommunications and data transmission applications. As a result, fiber optic networks must include an ever increasing number of enclosures in which one or more of the optical fibers are interconnected or otherwise terminated. For example, fiber optic networks, such as cable television (CATV) networks, may include a number of optical network units (ONUs) in which the optical signals propagating along the optical fibers are converted to respective electrical signals. In addition, telephone and CATV networks can include a number of network interface devices (NIDs), one of which is associated with each subscriber. Upon receiving the incoming optical signals, the NID splits and routes the signals to predetermined locations, such as to various telephone or CATV outlets. Like an ONU, the NID can also convert the incoming optical signals to electrical signals, if necessary. Fiber optic networks can also include a number of splice closures in which various ones of the optical fibers are spliced or optically connected.

These enclosures protect the optical fibers, such as from moisture or other forms of environmental degradation. These enclosures also isolate or otherwise protect the optical fibers within the enclosure from strain or torque imparted to a portion of the fiber optic cable outside of the enclosure in order to maintain proper alignment and spacing between the spliced optical fibers and to prevent undesirable signal attenuation.

These enclosures, such as ONUs, NIDs and splice closures, typically include a number of receptacles in which the individual optical fibers of a fiber optic cable are connected to respective optical fibers within the enclosure. The optical fibers within the enclosure can then be interconnected or otherwise terminated as desired. Conventionally, receptacles have included an externally threaded sleeve fixed to and extending outward from the enclosure. In order to provide for interconnection of the optical fibers, a ferrule holder can be disposed within the externally threaded sleeve. The ferrule holder defines one or more openings for receiving respective ferrules and for maintaining the ferrules in a predetermined position relative thereto. The ferrules are, in turn, mounted upon the end portions of one or more optical fibers which extend into the interior of the enclosure.

In order to mate with the receptacle of a conventional enclosure, a fiber optic connector assembly, typically referred to as a plug, is mounted upon the end portion of a fiber optic cable. Typically, the plug includes a generally cylindrical housing and a ferrule holder disposed within the cylindrical housing. The ferrule holder of the plug also defines one or more openings for receiving respective ferrules and for maintaining the ferrule in a predetermined position relative thereto. The ferrules are, in turn, connected to one or more optical fibers of the fiber optic cable such that mating of the plug and the receptacle will align or connect the optical fibers of the fiber optic cable with respective optical fibers within the enclosure.

In order to provide a secure mechanical engagement between the plug and the receptacle, the plug generally includes a rotatable coupling nut mounted on and at least partially surrounding the generally cylindrical housing. The coupling nut is internally threaded such that rotation of the coupling nut will threadably engage the externally threaded sleeve of the receptacle, thereby providing a secure mechanical engagement between the plug and the receptacle and, more importantly, between the fiber optic cable and the enclosure.

Prior to engagement with the receptacle, a fiber optic cable, including the end portion of the fiber optic cable upon which the plug is mounted, must oftentimes be installed, such as by pulling, along a predetermined cable path. In some instances, the fiber optic cable must extend through ducts or other small passageways which are not much larger than the fiber optic cable itself. Since the plug, including the coupling nut, typically has a greater cross-sectional size than the fiber optic cable, the size of the plug and, more specifically, the size of the coupling nut may limit the minimum size of the duct or other passageway through which the fiber optic cable can be installed. This limitation on the minimum size of the duct is becoming increasingly disadvantageous as additional emphasis is now placed upon reducing the space required for installing a fiber optic cable, i.e, reducing the duct size, in view of the large number of fiber optic cables which are currently being installed. To date, however, reductions in the size of the duct through which a fiber optic cable can be pulled are limited, at least in part, by the size of the plug, including the coupling nut, mounted upon the end portion of the fiber optic cable.

SUMMARY OF THE INVENTION

In order to address at least some of the shortcomings of conventional receptacle and plug designs, the receptacle of the present invention includes the rotatable coupling nut. Thus, the fiber optic connector assembly or plug which is mounted upon the end portion of the respective fiber optic cable need only include an externally threaded cylindrical housing and need not include a rotatable coupling nut. As such, the cross-sectional dimensions of the fiber optic connector assembly can be significantly decreased, thereby permitting the fiber optic cable, including the end portion of the fiber optic cable upon which the fiber optic connector assembly is mounted, to be pulled through much smaller ducts or passageways.

The coupling nut extends between a rear end and an opposed forward end and defines a longitudinally extending bore for receiving the fiber optic connector assembly. In addition, the coupling nut is at least partially internally threaded such that rotation of the coupling nut threadably engages the fiber optic connector assembly.

The receptacle also preferably includes a receptacle body adapted to be mounted in a fixed position, such as to a sidewall of an enclosure, such as a splice closure. The coupling nut cooperably engages the receptacle body such that the coupling nut is free to rotate relative to the receptacle body even though the longitudinal movement of the coupling nut relative to the receptacle body is limited. The receptacle body defines an aperture aligned with the longitudinally extending bore of the coupling nut. Preferably, the coupling nut extends through the aperture defined by the receptacle body. According to this embodiment, the coupling nut can also include a flange extending radially outward from the rear end thereof. In addition, the aperture defined by the receptacle body is preferably sized such that the flange engages the receptacle body to thereby limit longitudinal movement of the coupling nut in a forward direction relative to the receptacle body.

The receptacle can also include an inner sleeve extending at least partially through the longitudinally extending bore of the coupling nut from the rear end thereof. According to this embodiment, the forward portion of the coupling nut extending beyond the inner sleeve is internally threaded for threadably engaging the fiber optic connector assembly. The inner sleeve can include a flanged rear portion connected to the receptacle body rearward of the rear end of the coupling nut. As such, the flanged rear portion of the inner sleeve limits longitudinal movement of the coupling nut in a rearward direction relative to the receptacle body. Accordingly, the receptacle effectively restricts the longitudinal position of the coupling nut by confining the flange extending radially outward from the rear end of the coupling nut between the receptacle body and the flanged rear portion of the inner sleeve.

The receptacle can also include a ferrule holder defining at least one opening for receiving a respective ferrule and for maintaining the ferrule in a predetermined position. The ferrule holder is disposed within a longitudinally extending bore defined by the coupling nut such that the ferrule is exposed through the forward end of the coupling nut. According to one embodiment, the interior surface of the inner sleeve defines a circumferential groove for receiving a retaining ring which abuts a rear portion of the ferrule holder so as to limit longitudinal movement of the ferrule holder in a rearward direction. According to another embodiment, the receptacle can further include a retaining sleeve extending at least partially through the inner sleeve so as to abut a rear portion of the ferrule holder so as to limit longitudinal movement of the ferrule holder in a rearward direction. The receptacle can also include an annular seal disposed within the longitudinally extending bore and adjacent the forward end of the coupling nut for insuring a tight seal with the plug.

Accordingly, the receptacle of the present invention includes a rotatable coupling nut for threadably engaging a fiber optic connector assembly, such as a plug. As such, the fiber optic connector assembly or plug need not include a coupling nut. Thus, the cross-sectional dimensions of the fiber optic connector assembly can be significantly reduced in comparison to conventional designs so as to permit the fiber optic connector assembly and the fiber optic cable to which the fiber optic connector assembly is mounted to be installed within ducts or other passageways of a significantly smaller size. However, the receptacle of the present invention still provides a secure mechanical engagement between the receptacle and the fiber optic connector assembly and, more importantly, between the enclosure and the fiber optic cable.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
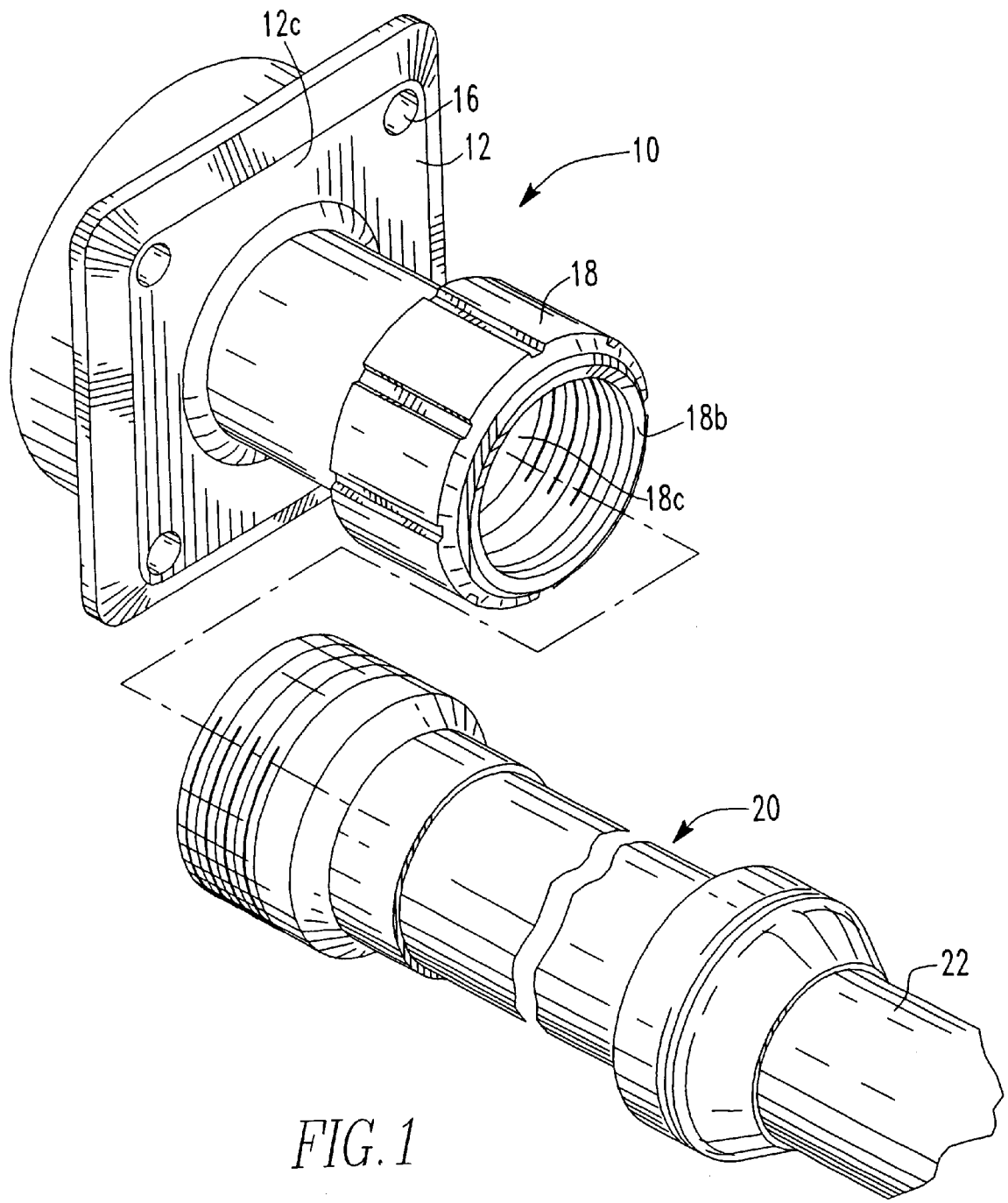
FIG. 1 is a perspective view of a fiber optic cable assembly of one embodiment of the present invention which illustrates a receptacle and a fiber optic connector assembly mounted upon the first end of a fiber optic cable in preparation for connection with the receptacle.
Figure 2:
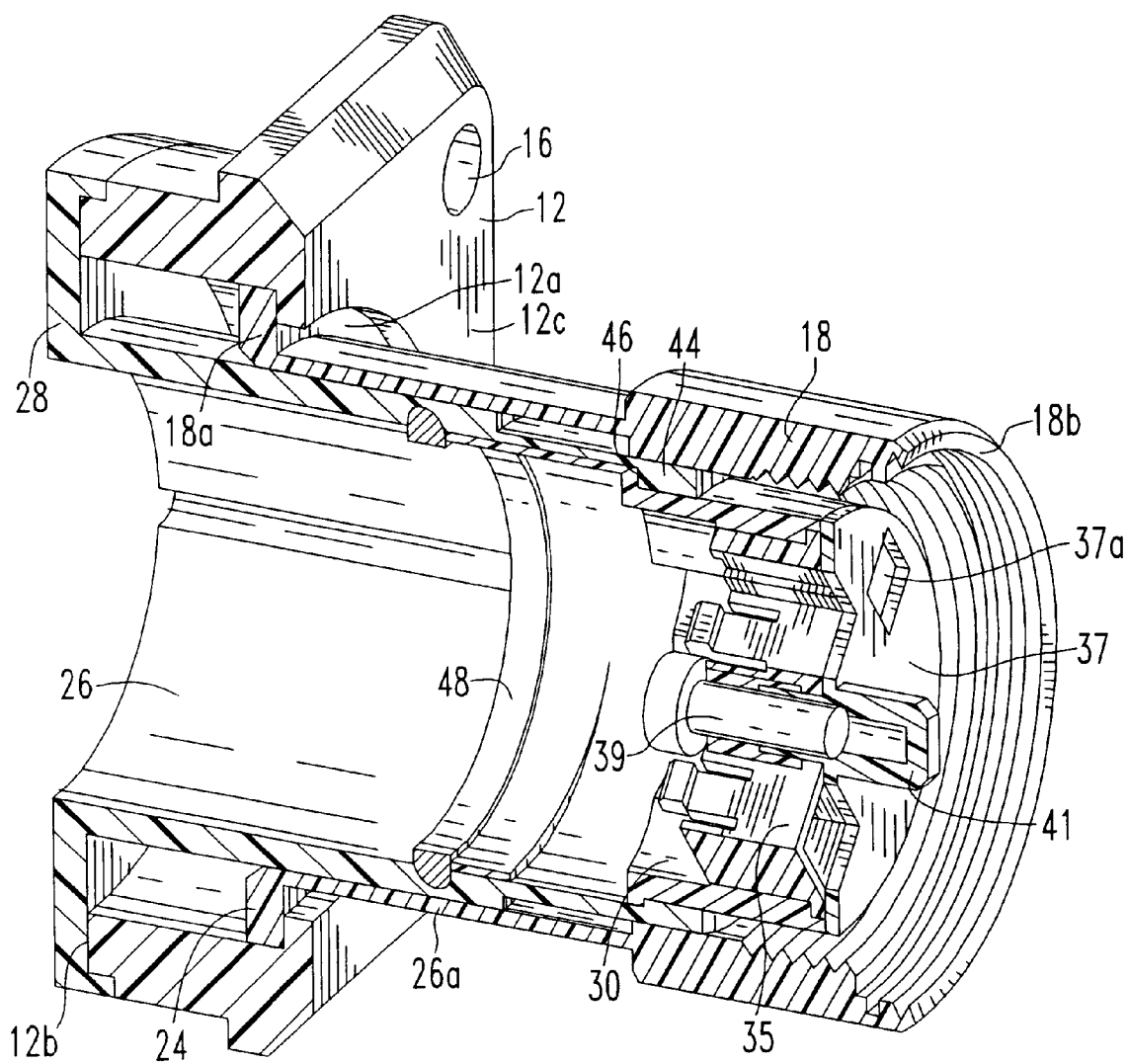
FIG. 2 is a cross-sectional view of one embodiment of the receptacle of FIG. 1.
Figure 3:
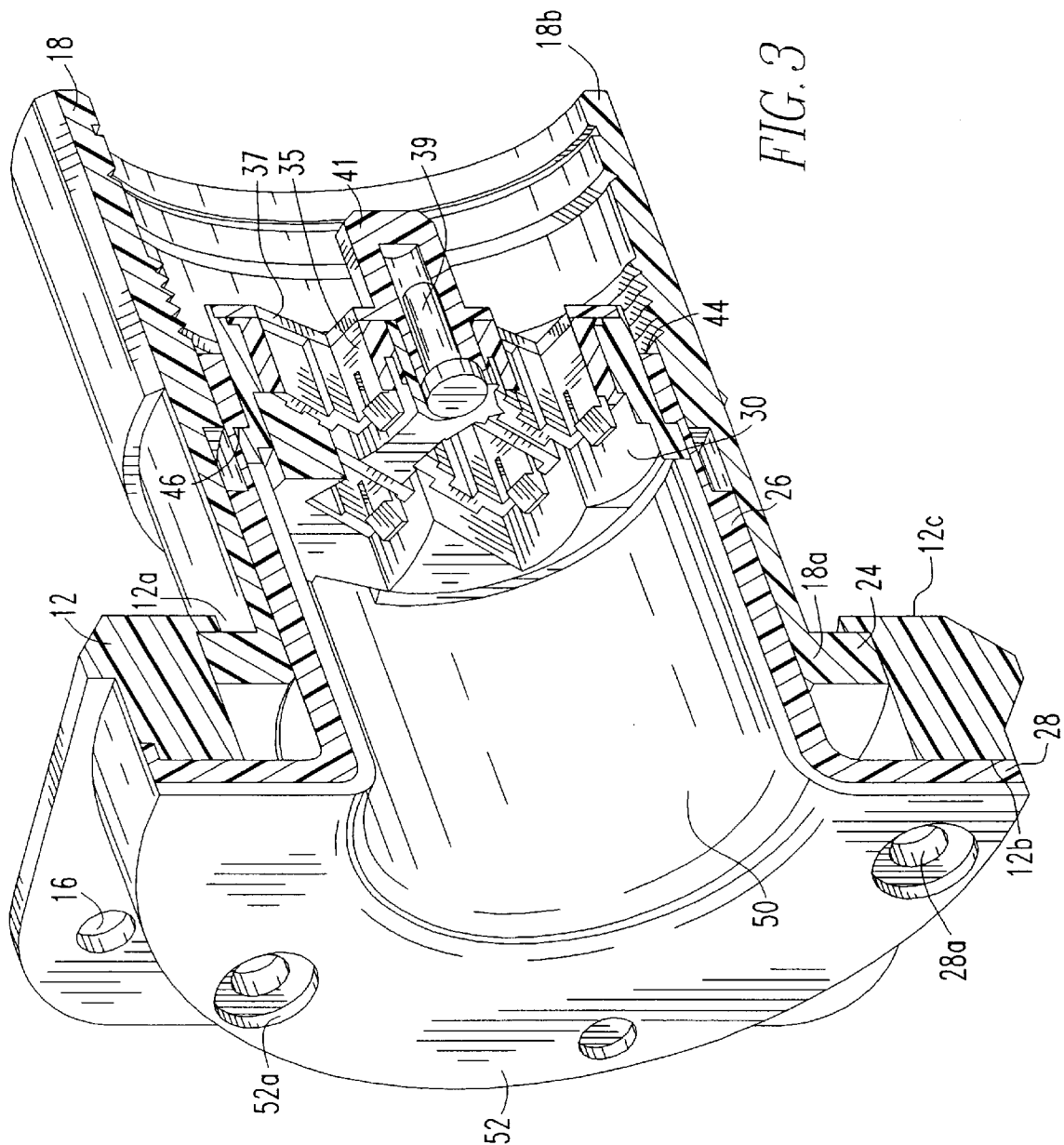
FIG. 3 is a cross-sectional view of another embodiment of the receptacle of FIG. 1.
Figure 5:
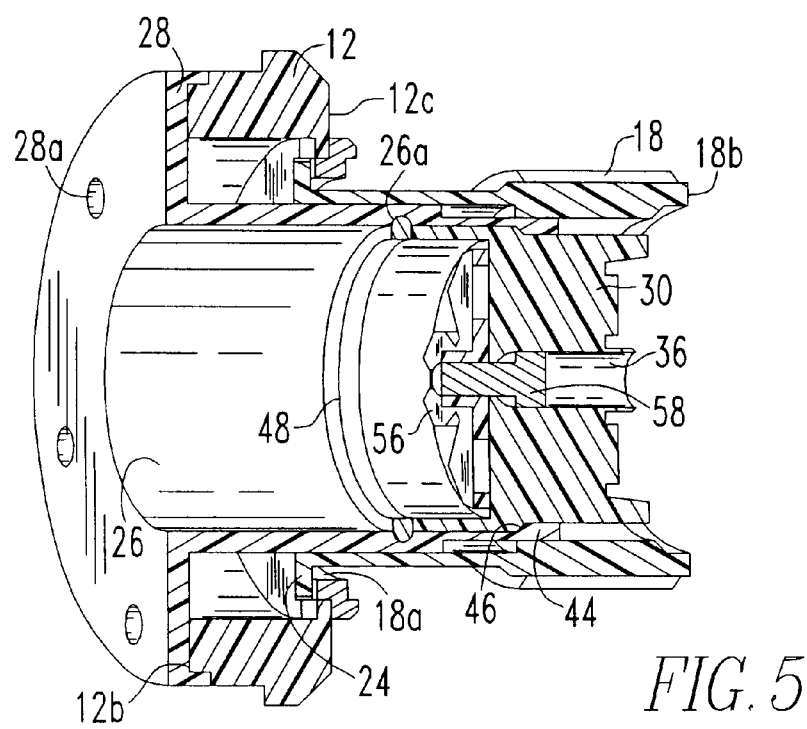
FIG. 5 is a cross-sectional view of a receptacle of another embodiment of the present invention which includes a ferrule holder adapted to receive a plurality of MT multi-fiber ferrules.

As shown in FIG. 1, the receptacle 10 of the present invention includes a receptacle body 12 defining an aperture 12a and adapted to be mounted in a fixed position, such as to a sidewall or other portion of an enclosure such as an ONU, NID or a splice closure, to thereby define an input port of the enclosure. Although the receptacle body can be mounted to the enclosure in a variety of manners, the receptacle body of the illustrated embodiment includes several openings 16 through which connectors or fasteners can extend for engaging the sidewall or other portion of the enclosure. The receptacle also includes a coupling nut 18 which cooperably engages the receptacle body such that the coupling nut is free to rotate relative to the receptacle body even though the longitudinal movement of the coupling nut relative to the receptacle body is limited, as described below. The coupling nut extends between a rear end 18a and an opposed forward end 18b and defines a longitudinally extending bore 18c. As shown in FIGS. 2, 3 and 5, the longitudinally extending bore of the coupling nut is aligned with the aperture defined by the receptacle body.

As described below, the coupling nut 18 receives at least a portion of a fiber optic connector assembly 20 (hereinafter referred to as a plug) mounted upon the end portion of a fiber optic cable 22. In this regard, several advantageous fiber optic connector assemblies or plugs which could readily mate with the receptacle 10 of the present invention are described in detail in U.S. patent application Ser. No. 08/870,666, entitled "*Flexible Connector Assembly Having Slack Storage*", filed concurrently herewith and assigned to the assignee of the present invention, the contents of which are incorporated by reference herein.

The fiber optic cable 22 upon which the plug 20 is mounted can include a single central buffer tube having one or more optical fibers or, alternatively, one or more optical fiber ribbons that each include a predetermined number of optical fibers. Alternatively, the fiber optic cable assembly can include other types of fiber optic cables, such as a fiber optic cable including a number of buffer tubes stranded about a central support member, without departing from the spirit and scope of the present invention. Regardless of the number and configuration of the buffer tubes, the fiber optic cable also generally includes a strength member surrounding or extending alongside the buffer tubes and a protective jacket surrounding the buffer tubes and the strength member.

According to the present invention, the coupling nut 18 is at least partially internally threaded. In addition, the longitudinally extending bore 18c defined by the coupling nut is sized such that the plug 20 can be received through the forward end 18b of the coupling nut. The plug is preferably externally threaded such that rotation of the coupling nut relative to the plug threadably engages the plug. As such, a secure mechanical engagement is established between the receptacle 10 and the plug and, more particularly, between the enclosure to which the receptacle is mounted and the fiber optic cable 22 on which the fiber optic assembly is mounted. As shown in FIG. 1, the receptacle can also include an annular seal, typically formed of commercially available O-ring, disposed within the longitudinally extending bore and adjacent the forward end of the coupling nut for insuring a tight seal with the plug. Although the threaded engagement of the coupling nut and the plug provides a secure mechanical engagement therebetween, the plug can be disengaged from the receptacle by rotating the coupling nut in the opposite direction relative to the plug.

The coupling nut 18 can cooperably engage the receptacle body 12 in a variety of fashions without departing from the spirit and scope of the present invention. In the illustrated embodiment, however, the coupling nut extends through the aperture 12a defined by the receptacle body. The coupling nut of this embodiment includes a flange 24 extending radially outward from a rear end 18a of the coupling nut. As illustrated, the outer diameter of the flange is larger than the diameter of the aperture defined by the receptacle body such that the flange engages a rear surface 12b of the receptacle body as the coupling nut is moved in a forward direction, thereby limiting longitudinal movement of the coupling nut in the forward direction relative to the receptacle body.

The receptacle 10 can also include an inner sleeve 26. The inner sleeve extends through the rear end 18a of the coupling nut 18 and at least partially through the longitudinally extending bore 18c of the coupling nut. As illustrated in FIGS. 2, 3 and 5, a forward portion of the coupling nut extends beyond the inner sleeve and is internally threaded for threadably engaging the plug 20. The inner sleeve includes a flanged rear portion 28. The flanged rear portion of the inner sleeve is connected to a portion of the receptacle rearward of the rear end of the coupling nut. Although the flanged rear portion of the inner sleeve can be connected to the receptacle body in a variety of fashions, the flanged rear portion of one embodiment includes a number of openings 28a through which respective connectors or fasteners can extend for engaging the receptacle body 12. As a result of the connection of the flanged rear portion of the inner sleeve to the receptacle body at a location rearward of the rear end of the coupling nut, the flanged rear portion of the inner sleeve limits longitudinal movement of the coupling nut in a rearward direction relative to the receptacle body.

In the illustrated embodiment, the receptacle body 12 defines a generally cylindrical aperture 12a having a stepped diameter. In particular, the portion of the cylindrical aperture adjacent the front surface 12c of the receptacle body has a smaller diameter than the portion of the cylindrical aperture adjacent the rear surface 12b of the receptacle body. In order to cooperably engage the coupling nut, the diameter of the portion of the cylindrical aperture adjacent the front surface of the receptacle body is less than the diameter of the flange 24 extending radially outward from the rear end 18a of the coupling nut 18. However, the diameter of the portion of the cylindrical opening adjacent the rear surface of the receptacle body equals or exceeds the diameter of the flange extending radially outward from the rear end of the coupling nut. Thus, the receptacle body and the inner sleeve 26 cooperate to define an annular pocket or window within which the flange extending radially outward from the rear end of the coupling nut can move in a longitudinal direction with the forward movement of the coupling nut limited by the receptacle body and the rearward movement of the coupling nut limited by the flanged rear portion 28 of the inner sleeve.

The receptacle 10 also generally includes a ferrule holder 30 disposed within the longitudinally extending bore 18c defined by the coupling nut 18. As shown in FIGS. 2 and 3, the ferrule holder defines a number of openings 32 for receiving respective ferrules 34. The openings in the ferrule holder are sized and shaped to receive the ferrules and to maintain the ferrules in respective predetermined positions relative to the ferrule holder and, in turn, relative to the receptacle. The ferrules can include single fiber ferrules that are mounted upon the end portions of respective optical fibers. Alternatively, the ferrules can include multi-fiber ferrules, such as the MT ferrules shown in FIGS. 5 and 6, mounted on the end portions of respective ones of the optical fibers. For example, the multi-fiber ferrules mounted upon the end portions of respective optical fiber ribbons.

Figure 6:
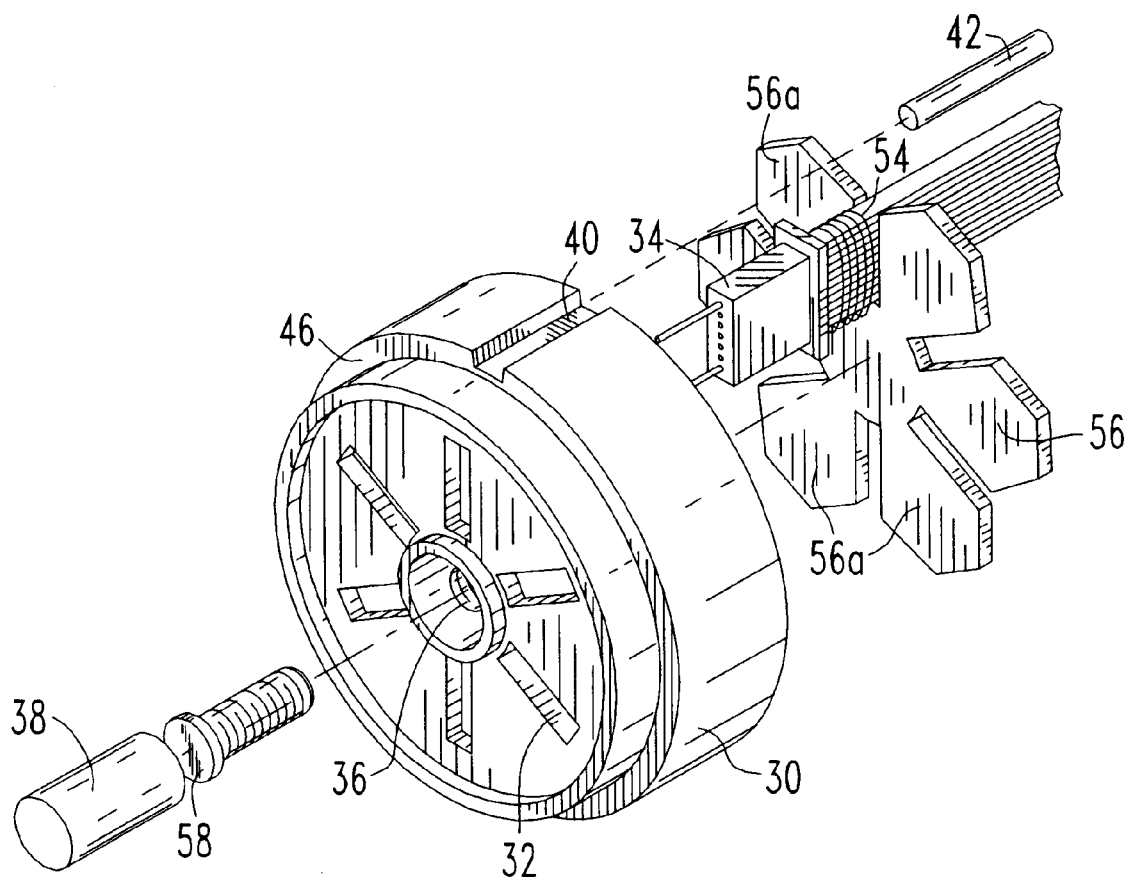
FIG. 6 is an exploded perspective view of the ferrule holder of FIG. 5 which is adapted to receive a plurality of MT multi-fiber ferrules.

The receptacle 10 can include a variety of ferrule holders 30 without departing from the spirit and scope of the present invention. As illustrated in FIGS. 5 and 6, however, the ferrule holder of one advantageous embodiment is adapted to receive and hold a number of multi-fiber ferrules 34, such as MT ferrules, in respective predetermined positions. For example, the ferrule holder of this embodiment can hold six or twelve MT ferrules disposed in a radial arrangement and separated by equal angular increments.

Figure 4:
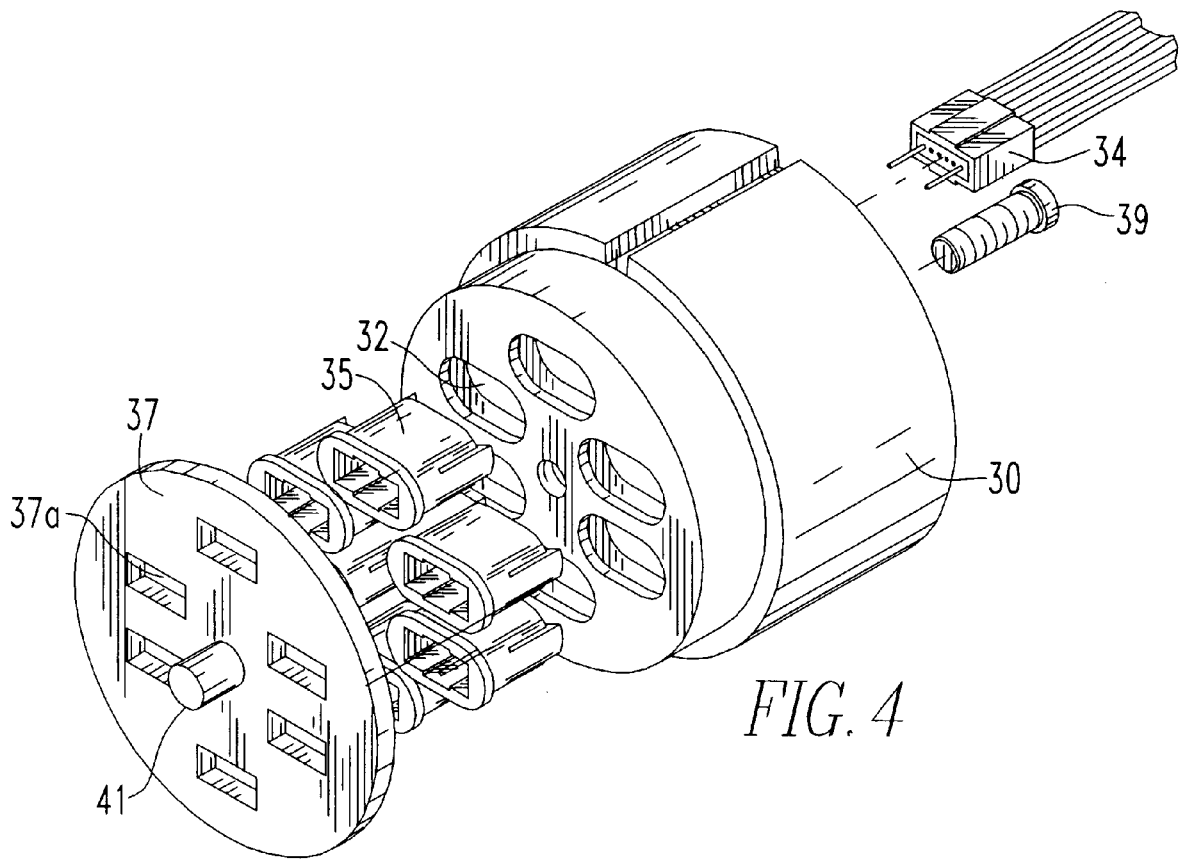
FIG. 4 is an exploded perspective view of a ferrule holder of one advantageous embodiment which is adapted to receive a plurality of MTP connectors, each of which includes a respective MT multi-fiber ferrule.

Alternatively, the ferrule holder 30 can be designed to receive fully connectorized optical fibers. In this embodiment, the ferrule holder can define openings 32 that have been sized and shaped to receive ferrule sleeves 35 which, in turn, receive ferrules 34 that have already been mounted within a connector housing. As shown in FIGS. 2–4, for example, the ferrule holder has six ferrule sleeves and is therefore adapted to receive six MTP connectors, each of which includes a respective MT ferrule mounted upon the end portion of an optical fiber ribbon.

As also shown in FIGS. 2–4, a ferrule sleeve holder 37 can be attached to the forward surface of the ferrule holder 30, such as by means of a bolt or other connector 39 extending from the rear through a centrally located aperture 36 of the ferrule holder. The ferrule sleeve holder defines a number of openings 37a equal to the number of openings 32 defined by the ferrule holder. The openings defined by the ferrule sleeve holder are aligned with the openings defined by the ferrule holder and, in turn, are aligned with respective ones of the ferrule sleeves 35. In addition, the openings defined by the ferrule sleeve holder generally correspond in shape and size to the openings defined by the ferrule holder. However, the openings defined by the ferrule sleeve holder are slightly smaller than the forward end of the ferrule sleeves such that the ferrule sleeve holder effectively secures the ferrule sleeves within the corresponding openings defined by the ferrule holder.

Regardless of the embodiment, the ferrule holder 30 of one embodiment defines a centrally located opening 36 for receiving and frictionally engaging an alignment member 38. See FIGS. 5 and 6. The alignment member is generally a post that extends outwardly from the front face of the ferrule holder for engaging a corresponding opening defined by the ferrule holder of the plug 20, thereby facilitating alignment and interconnection of the optical fibers within the enclosure with respective optical fibers of the fiber optic cable 22. Instead of a centrally located opening, the ferrule holder or the ferrule sleeve holder 37 of an alternative embodiment shown in FIGS. 2–4 can include an outwardly extending alignment pin 41 for engaging a corresponding opening defined by the ferrule holder of the plug and for facilitating alignment and interconnection of the respective optical fibers. The outwardly extending alignment member or alignment pin can also include a longitudinal groove, rib or other alignment feature for engaging a corresponding alignment feature within the centrally located opening(s) defined by the ferrule holder(s), thereby insuring that the ferrule holders are also angularly or rotationally aligned. However, the receptacle 10 can include other means for aligning the ferrule holder and, in turn, the ferrules with the ferrule holder of the plug without departing from the spirit and scope of the present invention. For example, the outer surface of the ferrule holder can define a lengthwise extending groove 40 for receiving one end of an alignment pin 42 that serves to align the ferrule holder, such as with a ferrule holder disposed within the plug. See FIG. 6.

According to the embodiment of the present invention in which the ferrule holder 30 is adapted to receive a plurality of MT multi-fiber ferrules, the ferrule holder can also include a plurality of springs 54, one of which is associated with and engages the rear surface of each ferrule. As such, the springs bias the ferrules outwardly toward the forward end 18b of the coupling nut 18. The ferrule holder can also include a spring plate 56 disposed within the longitudinally extending bore 18c of the coupling nut. As illustrated in FIGS. 5 and 6, the spring plate is preferably attached to the rear of the ferrule holder, such as by means of a bolt 58 having a head portion that is retained at least partially within the centrally located opening 36 and a shank portion which threadably engages a threaded aperture defined by the spring plate. According to one advantageous embodiment, the spring plate includes a number of radially extending arms 56a. As shown, the optical fibers extend between the radial arms of the spring plate, while the springs press against one or more of the radial arms. Thus, the springs urge the plurality of ferrules outwardly toward the forward end of the coupling nut.

According to the illustrated embodiment, the inner sleeve 26 serves to retain the ferrule holder 30 within the receptacle 10 by limiting movement of the ferrule holder in the forward direction through the longitudinally extending bore 18c defined by the coupling nut 18. In this regard, the ferrule holder has a stepped outer diameter including a portion adjacent the rear surface of the ferrule holder which has a larger diameter than the forward portion of the ferrule holder. As illustrated in FIGS. 2, 3 and 5, the forward end of the inner sleeve preferably defines a lip or rib 44 extending radially inward. The radially inwardly extending lip engages a shoulder 46 defined by the stepped exterior diameter of the ferrule holder to thereby limit forward longitudinal movement of the ferrule holder. Although not illustrated, the coupling nut, instead of the inner sleeve, could include a lip or rib which extends radially inward in order to limit the forward longitudinal movement of the ferrule holder without departing from the spirit and scope of the present invention.

The longitudinal movement of the ferrule holder 30 in a rearward direction is also limited by the receptacle 10 of the present invention. According to a first embodiment shown in FIG. 2, the interior surface of the inner sleeve 26 defines a circumferential groove 26a in which a retaining ring 48, such as a slip ring, is disposed. The retaining ring abuts the rear portion of the ferrule holder so as to limit longitudinal movement of the ferrule holder in a rearward direction. Alternatively, the receptacle can further include a retaining sleeve 50 extending at least partially through the inner sleeve from a rear end thereof. In the embodiment illustrated in FIG. 3, the retaining sleeve also includes a flanged rear portion 52 defining a number of openings 52a through which connectors or fasteners extend for connecting the retaining sleeve to the flanged rear portion 28 of the inner sleeve and, in turn, to the receptacle body 12. However, the retaining sleeve can be attached to the inner sleeve and/or the receptacle body in a variety of other fashions without departing from the spirit and scope of the present invention. As illustrated in FIG. 3, the retaining sleeve abuts a rear portion of the ferrule holder so as to limit longitudinal movement of the ferrule holder in a rearward direction.

According to either embodiment, the ferrule holder 30 is therefore held within the longitudinally extending bore 18c defined by the coupling nut 18. As such, the ferrules 34 and, in turn, the optical fibers upon which the ferrules are mounted are aligned and interconnected with the ferrules and, in turn, the optical fibers of the plug 20 upon engagement of the plug by the coupling nut of the receptacle 10 of the present invention.

Accordingly, the receptacle 10 of the present invention includes a rotatable coupling nut 18 for threadably engaging a fiber optic connector assembly, such as a plug 20. As such, the plug need not include a coupling nut. Thus, the cross-sectional dimensions of the plug can be significantly reduced in comparison to conventional plugs which incorporate a coupling nut, thereby permitting the plug and the fiber optic cable to which the plug is mounted to be installed within ducts or other passageways of significantly smaller size. However, the receptacle of the present invention still provides a secure mechanical engagement between the receptacle and the plug and, more importantly, between the enclosure and the fiber optic cable 22.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A receptacle for receiving a fiber optic connector assembly, the receptacle comprising:

a receptacle body adapted to be mounted in a fixed position, said receptacle body defining an aperture; and a coupling nut extending between a rear end and an opposed forward end and defining a longitudinally extending bore aligned with the aperture of said receptacle body for receiving the fiber optic connector assembly, said coupling nut cooperably engaging said receptacle body such that said coupling nut is free to rotate relative to said receptacle body and such that longitudinal movement of said coupling nut relative to said receptacle body is limited, wherein said coupling nut is at least partially internally threaded such that rotation of said coupling nut threadably engages the fiber optic connector assembly.

2. A receptacle according to claim 1 wherein said coupling nut extends through the aperture defined by said receptacle body, wherein said coupling nut comprises a flange extending radially outward from the rear end thereof, and wherein the aperture defined by said receptacle body is sized such that the flange engages said receptacle body to thereby limit longitudinal movement of said coupling nut in a forward direction relative to said receptacle body.

3. A receptacle according to claim 2 further comprising an inner sleeve extending at least partially through the longitudinally extending bore of said coupling nut from the rear end thereof, wherein a forward portion of said coupling nut that extends beyond said inner sleeve is internally threaded for threadably engaging the fiber optic connector assembly.

4. A receptacle according to claim 3 wherein said inner sleeve comprises a flanged rear portion connected to said receptacle body rearward of the rear end of said coupling nut to thereby limit longitudinal movement of said coupling nut in a rearward direction relative to said receptacle body.

5. A receptacle according to claim 3 further comprising a ferrule holder defining at least one opening for receiving a respective ferrule and for maintaining the ferrule in a predetermined position relative thereto, said ferrule holder disposed within the longitudinally extending bore defined by said coupling nut such that the ferrule is exposed through the forward end thereof.

6. A receptacle according to claim 5 wherein an interior surface of said inner sleeve defines a circumferential groove, and wherein said receptacle further comprises a retaining ring disposed within the circumferential groove for abutting a rear portion of said ferrule holder so as to limit longitudinal movement of said ferrule holder in a rearward direction.

7. A receptacle according to claim 5 further comprising a retaining sleeve extending at least partially through said inner sleeve, wherein said retaining sleeve abuts a rear portion of said ferrule holder so as to limit longitudinal movement of said ferrule holder in a rearward direction.

8. A receptacle according to claim 1 further comprising an annular seal disposed within the longitudinally extending bore and adjacent the forward end of said coupling nut.

9. A receptacle for receiving a fiber optic connector assembly, the receptacle comprising:
a coupling nut extending between a rear end and an opposed forward end and defining a longitudinally extending bore for receiving the fiber optic connector assembly; and
an inner sleeve extending at least partially through the longitudinally extending bore of said coupling nut from the rear end thereof,
wherein said coupling nut and said inner sleeve cooperate to limit longitudinal movement of said coupling nut relative to said inner sleeve, wherein said coupling nut is free to rotate relative to said inner sleeve, and wherein a forward portion of said coupling nut that extends beyond said inner sleeve is at least partially internally threaded such that rotation of said coupling nut threadably engages the fiber optic connector assembly.

10. A receptacle according to claim 9 further comprising a receptacle body adapted to be mounted in a fixed position, wherein said receptacle body defines an aperture through which said coupling nut extends, wherein said coupling nut comprises a flange extending radially outward from the rear end thereof, and wherein the aperture defined by said receptacle body is sized such that the flange engages said receptacle body to thereby limit longitudinal movement of said coupling nut in a forward direction relative to said receptacle body.

11. A receptacle according to claim 10 wherein said inner sleeve comprises a flanged rear portion connected to said receptacle body rearward of the rear end of said coupling nut to thereby limit longitudinal movement of said coupling nut in a rearward direction relative to said receptacle body.

12. A receptacle according to claim 9 further comprising a ferrule holder defining at least one opening for receiving a respective ferrule and for maintaining the ferrule in a predetermined position relative thereto, said ferrule holder disposed within the longitudinally extending bore defined by said coupling nut such that the ferrule is exposed through the forward end thereof.

13. A receptacle according to claim 12 wherein an interior surface of said inner sleeve defines a circumferential groove, and wherein said receptacle further comprises a retaining ring disposed within the circumferential groove for abutting a rear portion of said ferrule holder so as to limit longitudinal movement of said ferrule holder in a rearward direction.

14. A receptacle according to claim 12 further comprising a retaining sleeve extending at least partially through said inner sleeve, wherein said retaining sleeve abuts a rear portion of said ferrule holder so as to limit longitudinal movement of said ferrule holder in a rearward direction.

15. A receptacle according to claim 9 further comprising an annular seal disposed within the longitudinally extending bore and adjacent the forward end of said coupling nut.

16. A receptacle for receiving a fiber optic connector assembly, the receptacle comprising:
a receptacle body defining an aperture;
a coupling nut defining a longitudinally extending bore aligned with the aperture of said receptacle body for receiving the fiber optic connector assembly; and
an inner sleeve extending at least partially through the longitudinally extending bore of said coupling nut,
wherein said coupling nut cooperably engages said receptacle body such that said coupling nut is free to rotate relative to both said receptacle body and said inner sleeve, and
wherein a portion of said coupling nut that extends beyond said inner sleeve is at least partially internally threaded such that rotation of said coupling nut threadably engages the fiber optic connector assembly.

17. A receptacle according to claim 16 wherein said coupling nut extends longitudinally between a rear end and an opposed forward end, wherein said coupling nut extends through the aperture defined by said receptacle body, wherein said coupling nut comprises a flange extending radially outward from the rear end thereof, and wherein the aperture defined by said receptacle body is sized such that the flange engages said receptacle body to thereby limit longitudinal movement of said coupling nut in a forward direction relative to said receptacle body.

18. A receptacle according to claim 17 wherein said inner sleeve comprises a flanged rear portion connected to said receptacle body rearward of the rear end of said coupling nut to thereby limit longitudinal movement of said coupling nut in a rearward direction relative to said receptacle body.

19. A receptacle according to claim 16 further comprising a ferrule holder defining at least one opening for receiving a respective ferrule and for maintaining the ferrule in a predetermined position relative thereto, said ferrule holder disposed within the longitudinally extending bore defined by said coupling nut such that the ferrule is exposed through one end thereof.

20. A receptacle according to claim 19 wherein an interior surface of said inner sleeve defines a circumferential groove, and wherein said receptacle further comprises a retaining ring disposed within the circumferential groove for abutting said ferrule holder so as to limit longitudinal movement thereof.

21. A receptacle according to claim 19 further comprising a retaining sleeve extending at least partially through said inner sleeve, wherein said retaining sleeve abuts said ferrule holder so as to limit longitudinal movement thereof.

22. A receptacle according to claim 16 wherein said coupling nut extends longitudinally between a rear end and an opposed forward end, and wherein the receptacle further comprises an annular seal disposed within the longitudinally extending bore and adjacent the forward end of said coupling nut.

23. A receptacle for receiving a fiber optic connector assembly, the receptacle comprising:

a receptacle body adapted to be mounted in a fixed position, said receptacle body defining an aperture; and a coupling nut extending between a rear end and an opposed forward end and defining a longitudinally extending bore aligned with the aperture of the receptacle body for receiving the fiber optic connector assembly, said coupling nut slidingly engaging the receptacle body such that the coupling nut freely rotates relative to the receptacle body and freely slides longitudinally between a first and a second position, the coupling nut being at least partially internally threaded to engage threads on an outer surface of the fiber optic connector assembly.

* * * * *